UNITED STATES PATENT OFFICE.

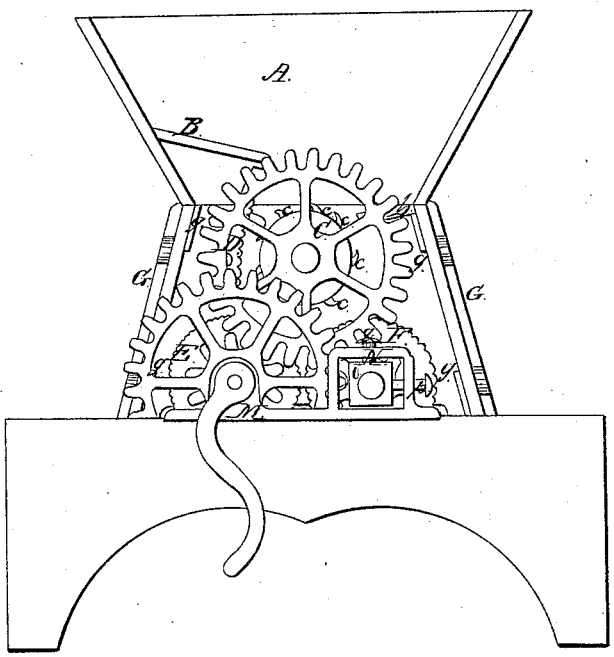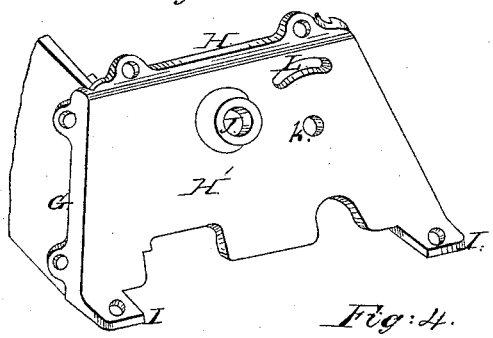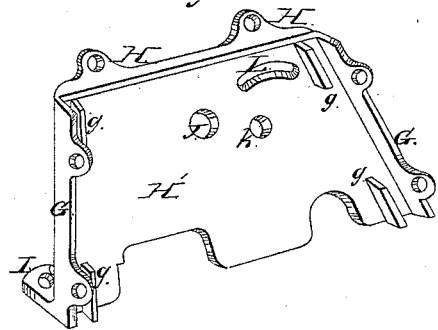

J. H. THOMAS AND P. P. MAST, OF SPRINGFIELD, OHIO.

IMPROVED CIDER-MILL.

Specification forming part of Letters Patent No. 51,101, dated November 21, 1865.

*To all whom it may concern:*

Be it known that we, J. H. THOMAS and P. P. MAST, of Springfield, in the county of Clarke and State of Ohio, have invented certain Improvements in Cider-Mills; and we do hereby declare the following to be a full, clear, and exact description of the same, reference being had to the accompanying drawings, in which—

Figure 1 is a side elevation of our machine, part of the casing being removed in order to show the internal arrangement. Fig. 2 is an external perspective view of one of the end plates. Fig. 3 is an internal perspective view of the same. Fig. 4 is a plan of the upper feed-roller.

That others may understand the construction of our machine, we will describe it.

A is the hopper, into which the fruit to be ground is put. On one side is the chute-board B, to conduct the fruit to the center of the hopper, under which is the feed or crushing roller C, Figs. 1, and 4.

Near to C is the serrated concave adjustable plate D, against which the fruit is crushed by C. Another chute-board, d, prevents the fruit from falling behind the roller C.

Beneath the roller C are the grinding-rollers E and F, and to the shaft of one of these rollers the power to drive the machine is applied.

It will be observed that a system of gearing is used which causes the three rollers to revolve at different speeds, as, if the power is applied at E, motion is communicated to F through a gaining pair, and motion is communicated to C through a diminishing pair, so that C will move quite slowly to crush the fruit, E will move more rapidly, and F will move very fast. The effect of this arrangement is that the pomace, in passing through between the rollers E and F, will not only be squeezed by direct pressure, but it will also be torn and crushed still more, and the feed will also be secured.

The roller C is provided with the ridges c c, which are made to alternate, as shown, in order to equalize the resistance as far as possible.

In constructing our machine we use plates of metal for the ends H', which are cast in the form represented, so that they are not only attached to the side pieces with the utmost facility, but they serve to strengthen the machine and to keep all the parts in place and unaffected by any shrinking and swelling due to atmospheric influences or contact with the juice of the fruit. These plates, Figs. 2 and 3, are provided with the flanges G and g, by which the side pieces are secured, the flanges H, by means of which the hopper is attached, and the flanges or feet I, by means of which the machine is attached to the table or stand upon which it is to work. It is also provided with the bearings J and K, the one for the journals of the roller C and the other for the pivot-rod of the concave plate D.

In order to adjust the plate D and hold it at any desired distance from the roller C a rod is inserted, the ends of which project through the curved slot L, there being a head on one end of the same and a set-nut on the other.

The bearings for the rollers E and F are fixed on plates M, attached to the frame or table supporting the machine. The bearings for one of the rollers, E or F, is cast solidly upon the plate M, while the box O of the other journal is set in the frame N, which is cast in one piece with the plate M. The box O, which is set in the frame N, is made adjustable to bring that roller nearer the other one by means of the set-screws $p$ and $q$, the end of the screw $q$ also setting in a groove in the top of the box, which prevents it from slipping sidewise or out of the frame.

Having described our invention, what we claim as new, and desire to secure by Letters Patent, is—

1. The roller C, provided with the flanges c, alternating, as shown, in combination with the rollers E and F, when so arranged that each shall revolve at different velocities.

2. The adjustable concave turning on journals at the lower end and located above the roller F, as and for the purpose set forth.

3. The metallic side plates of the grinding-case provided with bearings for the upper roller, C, as shown and described.

J. H. THOMAS.
P. P. MAST.

Witnesses:
B. HOLTZ,
W. C. DODGE,
WILLIAM ENOCH.